(12) United States Patent
Chen et al.

(10) Patent No.: US 10,879,759 B2
(45) Date of Patent: Dec. 29, 2020

(54) STATOR ASSEMBLY AND STEPPER DRIVE MOTOR INCLUDING SAME

(71) Applicant: Continental Automotive GmbH, Hannover (DE)

(72) Inventors: Kun Chen, Wuhu (CN); Tao Cheng, Wuhu (CN)

(73) Assignee: Continental Automotive GmbH, Hannover (DE)

( * ) Notice: Subject to any disclaimer, the term of this patent is extended or adjusted under 35 U.S.C. 154(b) by 303 days.

(21) Appl. No.: 15/926,029

(22) Filed: Mar. 20, 2018

(65) Prior Publication Data

US 2018/0248444 A1    Aug. 30, 2018

Related U.S. Application Data

(63) Continuation of application No. PCT/EP2016/072514, filed on Sep. 22, 2016.

(30) Foreign Application Priority Data

Sep. 22, 2015    (CN) .................... 2015 2 0733580 U (51) Int. Cl.
*H02K 11/40* (2016.01)
*H02K 5/22* (2006.01)
(Continued)

(52) U.S. Cl.
CPC .............. *H02K 5/225* (2013.01); *H02K 1/145* (2013.01); *H02K 3/525* (2013.01); *H02K 5/173* (2013.01);
(Continued)

(58) Field of Classification Search
CPC .......... H02K 5/225; H02K 37/14; H02K 7/06; H02K 3/525; H02K 11/40
See application file for complete search history.

(56) References Cited

U.S. PATENT DOCUMENTS 8,035,264 B2 * 10/2011 Kobayashi ............. H02K 3/525
310/49.11
2001/0026103 A1 * 10/2001 Suzuki ............... H02K 15/0056
310/71

(Continued)

FOREIGN PATENT DOCUMENTS

CN        201674378 U    12/2010
EP         1608052 A2    12/2005
(Continued)

OTHER PUBLICATIONS

International Search Report and Written Opinion dated Nov. 24, 2016 from corresponding International Patent Application No. PCT/EP2016/072514.

*Primary Examiner* — Dang D Le (57) ABSTRACT

A stator assembly, having a stator formed by a plurality of pole pieces by means of injection overmolding, a columnar connection portion protruding outward being provided on an edge of one of the pole pieces; a mounting groove located at a side face of the stator; a coil wound around the stator; a pin connector with a ground pin, the pin connector being press-fitted onto the mounting groove in the direction perpendicular to the axial direction of the stator; and a magnetically conductive ring, the stator, which is mounted with the coil and the pin connector, being pressed into the magnetically conductive ring. The stator assembly has the features of having few parts and being convenient to assemble.

24 Claims, 4 Drawing Sheets

(51) Int. Cl.
    *H02K 37/14*     (2006.01)
    *H02K 1/14*      (2006.01)
    *H02K 3/52*      (2006.01)
    *H02K 7/106*     (2006.01)
    *H02K 11/33*     (2016.01)
    *H02K 5/173*     (2006.01)

(52) U.S. Cl.
    CPC ............ *H02K 7/106* (2013.01); *H02K 11/33* (2016.01); *H02K 11/40* (2016.01); *H02K 37/14* (2013.01)

(56) References Cited

U.S. PATENT DOCUMENTS

| | | |
|---|---|---|
| 2003/0214191 A1 | 11/2003 | Watzek et al. |
| 2006/0220474 A1* | 10/2006 | Yoshida ................ H02K 11/40 310/43 |
| 2006/0290226 A1 | 12/2006 | Ohkawa et al. |
| 2011/0095629 A1 | 4/2011 | Lee |

FOREIGN PATENT DOCUMENTS

| | | |
|---|---|---|
| JP | 2005020938 A | 1/2005 |
| JP | 2010530732 A | 9/2010 |
| KR | 1020080011796 A | 2/2008 |
| KR | 2020090005662 U | 6/2009 |

\* cited by examiner

STATOR ASSEMBLY AND STEPPER DRIVE MOTOR INCLUDING SAME

CROSS-REFERENCE TO RELATED APPLICATIONS

This application claims the benefit of PCT Application PCT/EP2016/072514, filed Sep. 22, 2016, which claims priority to Chinese Patent Application 201520733580.5, filed Sep. 22, 2015. The disclosures of the above applications are incorporated herein by reference.

FIELD OF THE INVENTION

The present device relates to the field of automobile parts, in particular to a stator assembly applied to an adaptive steering headlight of an automobile and a stepper drive motor including the stator assembly.

BACKGROUND OF THE INVENTION

In order to improve the driving and operating safety of the automobile, a system for adaptively controlling the irradiation direction of an automobile lamp is proposed in the relevant industry, which system is turned in a left-right and up-down direction as a function of a steering angle of a steering wheel and an elevation and azimuth angle of a body suspension system, so that the irradiation direction of the automobile lamp (especially the headlight) may not only be directed toward the straight-ahead direction, but also toward the direction which is obtained by the driver's steering operation, and thus the system plays a significant role in improving the operating safety of the automobile.

In the above system for controlling an automobile lamp, a stepper drive motor (for example, a linear stepper drive motor) is currently used as the drive device; however, the stepper drive motor serving as a driving device and the stator included thereby in the prior art has the following defects: 1) the number of parts is large, the assembling process is relatively complicated, and the accuracy of an inner hole of the stator is not easy to control, and does not facilitate automated production; 2) the costs are high; and 3) the integration level is low. Specifically, as shown in the Chinese patent with the application no. 201020129236.2 and the publication no. CN 201674378 U, a stator assembly is formed by two pole pieces 17, two coil frameworks 18, two stator casings 15, and an external connector, and such an assembly has the above-mentioned defects.

SUMMARY OF THE INVENTION

The purpose of the present device is to provide a stepper drive motor applied to a headlight steering system and a stator assembly included therein, thereby solving the problems of a complicated processing and assembling process, a low production efficiency and high costs due to a large number of parts.

The stator assembly provided in the present device includes:

a stator formed by a plurality of pole pieces by means of injection overmolding, a columnar connection portion protruding outward being provided on an edge of one of the pole pieces; a mounting groove located at a side face of the stator; a coil wound around the stator; a pin connector with a ground pin, the pin connector being press-fitted onto the mounting groove in the direction perpendicular to the axial direction of the stator; and a magnetically conductive ring, the stator, which is mounted with the coil and the pin connector, being pressed into the magnetically conductive ring.

Preferably, the specific shape of the columnar connection portion is a Y-shaped connection port similar to an English letter Y.

Preferably, the ground pin is connected to the columnar connection portion via a wire.

Preferably, the ground pin is directly connected to the columnar connection portion after being bent.

Preferably, the columnar connection portion is in contact with the magnetically conductive ring.

Preferably, the columnar connection portion is located on one of the pole pieces closest to the pin connector.

Preferably, a metallic sleeve located inside the stator is also included, and the metallic sleeve is fixed inside the stator by means of injection molding or interference fit.

Preferably, a plurality of claw piece structures are provided at one end of the magnetically conductive ring.

Preferably, there are four the pole pieces.

Preferably, the stator has a wire slot, and a metal wire on the coil passes through the wire slot and is connected to the pin on the pin connector.

The present device further provides a stepper drive motor, including:

a stator formed by a plurality of pole pieces by means of injection overmolding, a columnar connection portion protruding outward being provided on an edge of one of the pole pieces; a mounting groove located at a side face of the stator; a coil wound around the stator; a pin connector with a ground pin, the pin connector being press-fitted onto the mounting groove in the direction perpendicular to the axial direction of the stator; a magnetically conductive ring, the stator, which is mounted with the coil and the pin connector, being pressed into the magnetically conductive ring; a rotor, a shaft and an annular magnet, wherein the rotor is pressed into the annular magnet in an interference fit manner, and the annular magnet is pressed into the stator; and the shaft passes through the interior of the rotor and is mutually fitted with an internal thread on the rotor via an external thread on the shaft, such that the rotational motion of the rotor is converted into a linear movement of the shaft.

Preferably, the specific shape of the columnar connection portion is a Y-shaped connection port similar to an English letter Y.

Preferably, the ground pin is connected to the columnar connection portion via a wire.

Preferably, the ground pin is directly connected to the columnar connection portion after being bent.

Preferably, the columnar connection portion is in contact with the magnetically conductive ring.

Preferably, the columnar connection portion is located on one of the pole pieces closest to the pin connector.

Preferably, the stepper drive motor further includes: a metallic sleeve located inside the stator, the metallic sleeve being fixed inside the stator by means of injection molding or interference fit, and one end of the rotor being nested around the metallic sleeve, and the rotor being in clearance fit with the metallic sleeve.

Preferably, the stator has a wire slot, and a metal wire on the coil passes through the wire slot and is connected to the pin on the pin connector.

Preferably, the stepper drive motor further includes a bearing connected to the rotor by means of injection molding or cold forming, an outer ring of the bearing being pressed into the stator.

Preferably, the stepper drive motor further includes a front end cover and a rear end cover, the front end cover is press-fitted into the magnetically conductive ring, and the rear end cover is press-fitted onto the pin connector.

Preferably, the stepper drive motor further includes an O-ring, and the O-ring is arranged on the front end cover in a nested manner.

Preferably, the stepper drive motor further includes a plurality of claw piece structures provided at one end of the magnetically conductive ring, and the plurality of claw piece structures on the magnetically conductive ring are pressed onto the front end cover after being bent.

Preferably, the stepper drive motor further includes a connecting ball, which is thermally riveted to an output end of the shaft.

Preferably, the outer ring of the bearing is press-fitted into a bearing fitting hole inside the stator, and the press-fit method is an interference fit or a clearance fit.

Compared with the prior art, since the present device uses the structural design of a novel stator assembly and a stepper drive motor, a wire is used to directly connect a pin connector with a Y-shaped connection port, and in the stepper drive motor, a metallic sleeve is used to replace a bearing, such that the number of parts of the stator assembly and the stepper drive motor including same is greatly reduced, the production process becomes easy, and the assembling process is simplified, thereby increasing the production efficiency and reducing the cost.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings constituting part of the present invention are used to provide a further understanding of the present device; and exemplary embodiments and illustrations thereof of the present device are used to explain the present device, and do not unduly limit the present device. In the drawings.

DETAILED DESCRIPTION OF THE PREFERRED EMBODIMENT

The following description of the preferred embodiment(s) is merely exemplary in nature and is in no way intended to limit the invention, its application, or uses.

The stator assembly and the stepper drive motor including same of the present device will be described below with reference to the accompanying drawings and the embodiments.

First Embodiment

FIGS. 1-4 show a stator assembly according to an embodiment of the present device, and as shown in FIGS. 1-4, the stator assembly specifically includes the following parts: a stator 1 formed by a plurality of pole pieces 101 by means of injection overmolding, a columnar connection portion 102 protruding outward being provided on an edge of one of the pole pieces; a mounting groove 103 which is located at a side face of the stator 1 and is integrally formed on the stator 1 by means of injection molding; a coil 2 wound around the stator 1 and used to generate a magnetic field, wherein the coil 2 may include one or two copper coils; a pin connector 3 with a ground pin 301, the pin connector 3 being press-fitted onto the mounting groove 103 in the direction perpendicular to the axial direction of the stator 1; and a magnetically conductive ring 4, the stator 1, which is mounted with the coil 2 and the pin connector 3, being pressed into the magnetically conductive ring 4, and the magnetically conductive ring 4 being in clearance fit with the stator 1.

Figure 1:
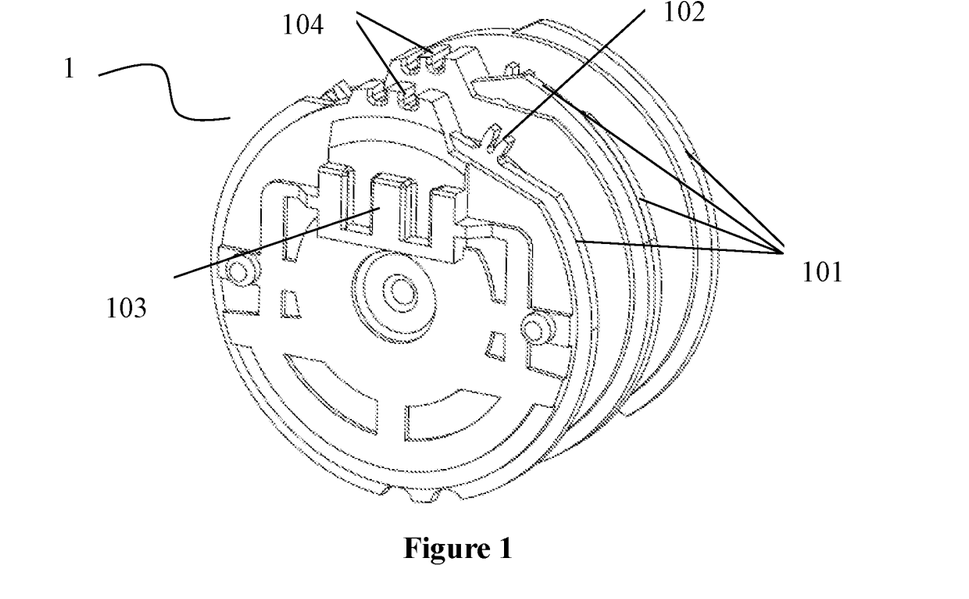
FIG. 1 is a schematic perspective view of a stator in the stator assembly of the present device.
Figure 2:
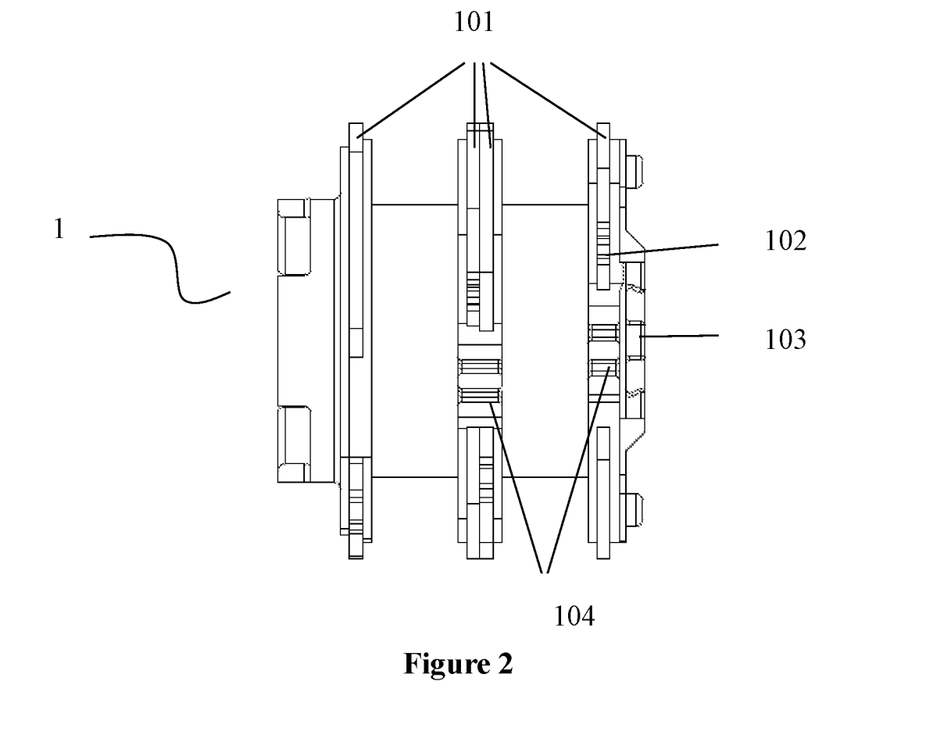
FIG. 2 is a top view of the stator shown in FIG. 1.
Figure 3:
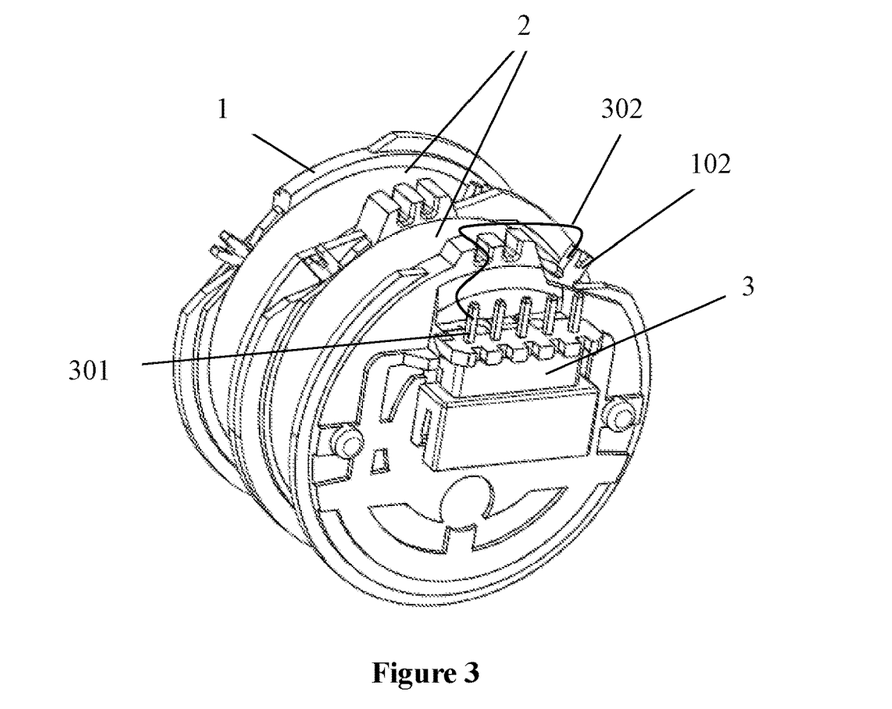
FIG. 3 is a schematic perspective view of the stator assembly including a stator, a coil and a pin connector.
Figure 4:
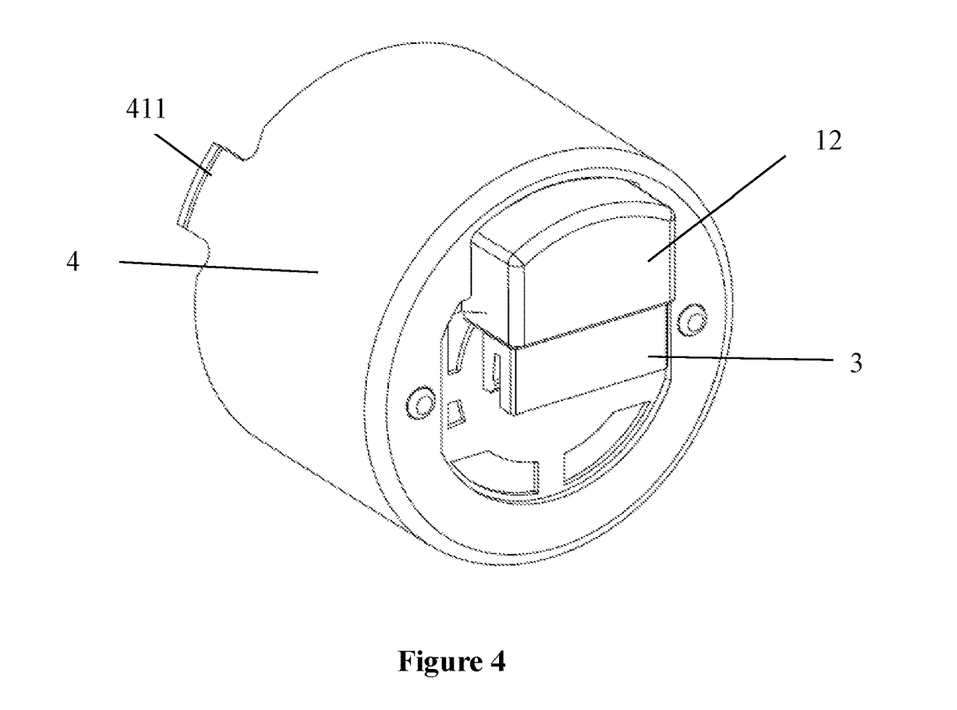
FIG. 4 is a schematic perspective view of the stator assembly on the basis of FIG. 3A, which further includes a magnetically conductive ring.
Figure 5:
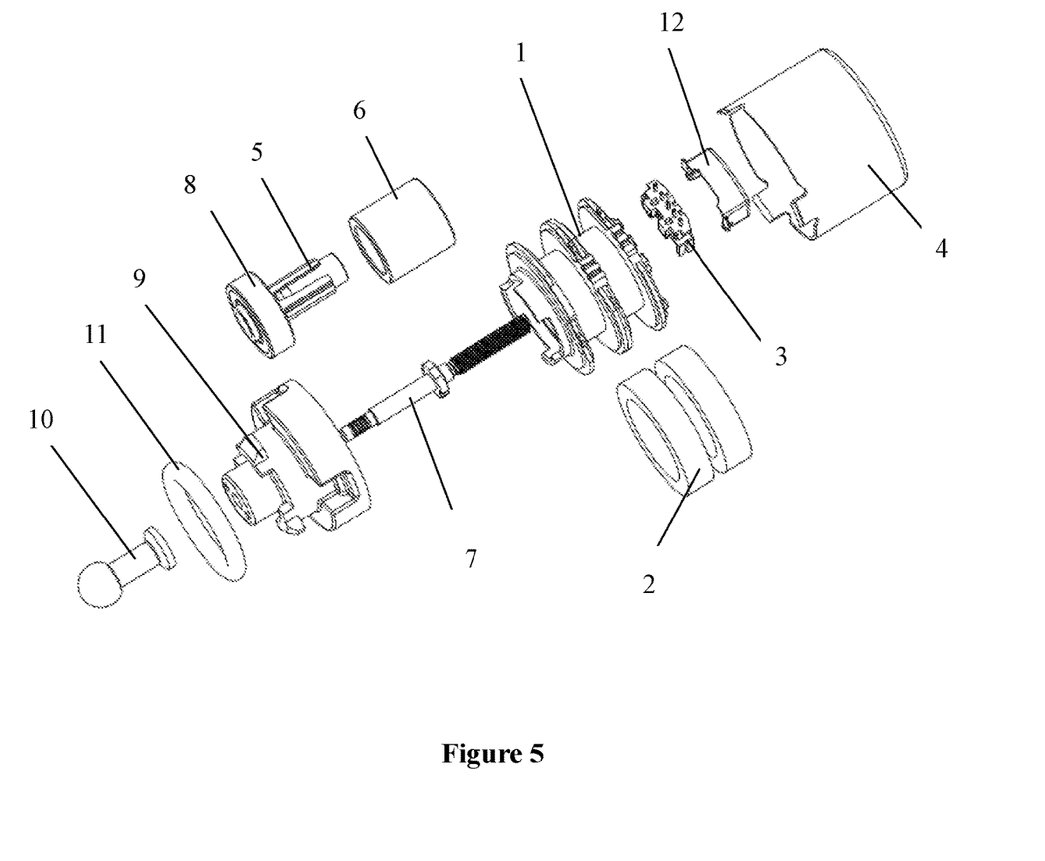
FIG. 5 is an exploded view of parts of a stepper drive motor including the stator assembly.
Figure 6:
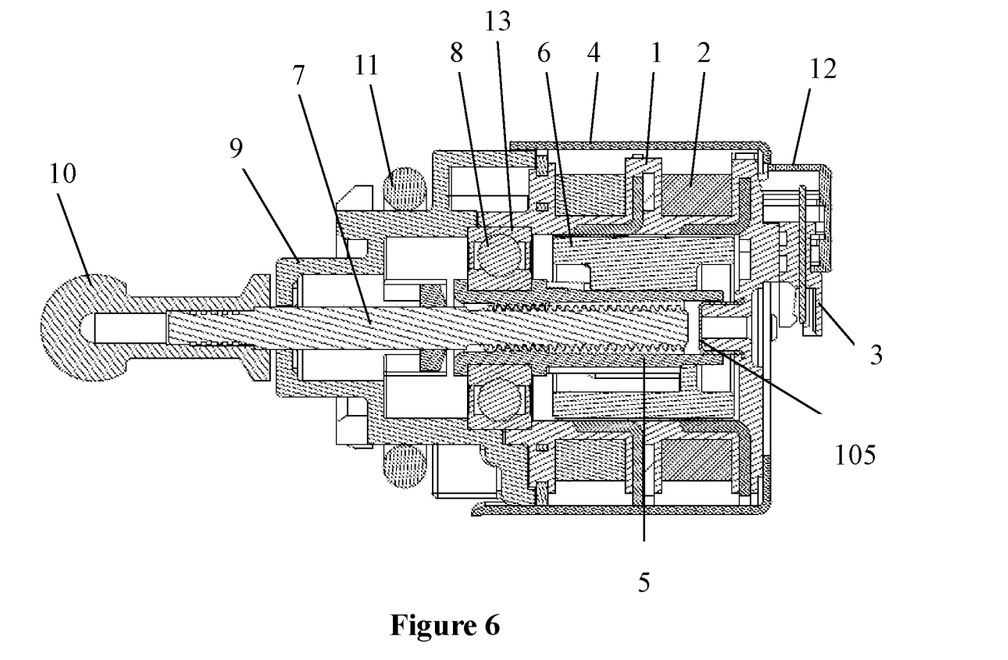
FIG. 6 is a sectional view of the assembled stepper drive motor shown in FIG. 5.
Figure 7:
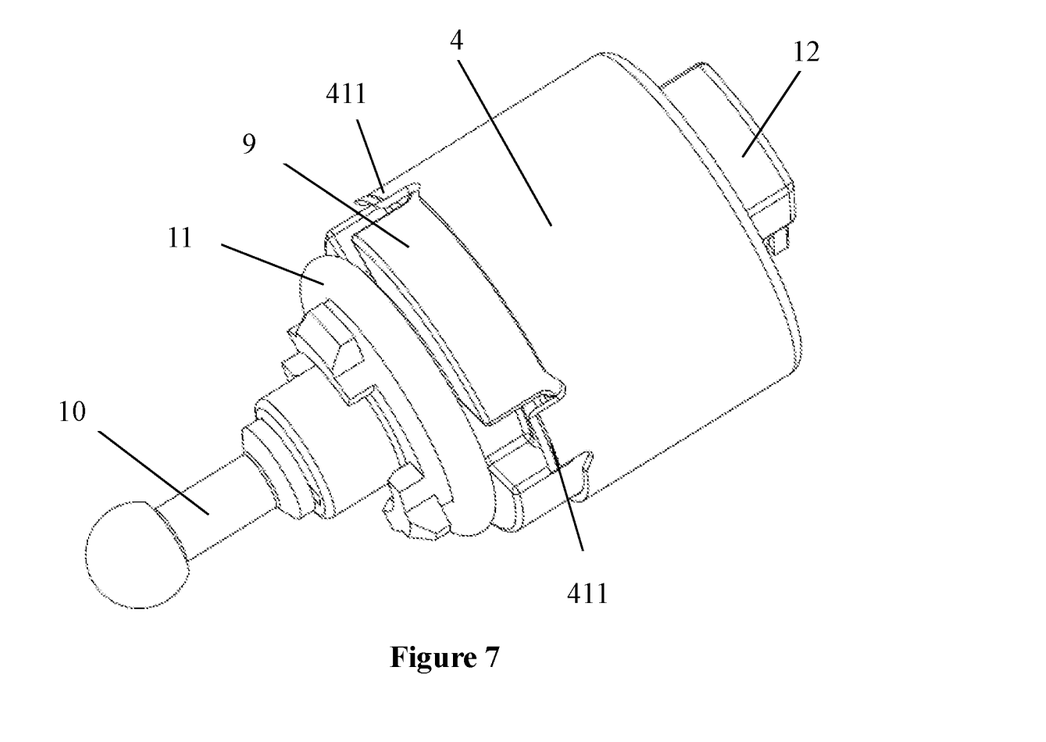
FIG. 7 is a schematic perspective view of the assembled stepper drive motor shown in FIG. 5.

Preferably, as shown in FIGS. 1 and 3A, the specific shape of the columnar connection portion 102 is a Y-shaped connection port similar to an English letter Y.

Preferably, the pin connector 3 has a plurality of pins, one ground pin of which is connected to the columnar connection portion 102 via a wire (or the ground pin is directly connected to the columnar connection portion 102 after being bent); and for the convenience of connection, the columnar connection portion 102 located on one of the pole pieces 101 closest to the pin connector 3 may be selected. In particular, as shown in FIG. 3A, the pin connector 3 has five pins, the ground pin 301 thereof is connected to the Y-shaped connection port 102 on the pole piece closest to the pin connector 3 via a wire 302 (one end of the wire 302 is connected to the ground pin 301, and the other end of the wire 302 is welded to the Y-shaped connection port 102); or the ground pin 301 may overlap or be welded together with the Y-shaped connection port 102 on the pole piece closest to the pin connector 3 after being directly bent (this case is not shown in the drawings).

Preferably, the columnar connection portion 102 (Y-shaped connection port) is in contact with the magnetically conductive ring 4, and on the basis of the preceding description, the magnetically conductive ring 4 establishes a connection with the ground pin 301, thereby satisfying the customer's requirements of electromagnetic compatibility (EMC) of the stepper drive motor including the stator assembly.

Preferably, the stator assembly further includes a metallic sleeve 105 located inside the stator 1, the metallic sleeve 105 being fixed inside the stator 1 by means of injection molding or interference fit.

Preferably, a plurality of claw piece structures 411 are provided at one end of the magnetically conductive ring 4.

Preferably, four the pole pieces 101 are provided.

Preferably, the stator 1 has a wire slot 104, and a metal wire on the coil 2 passes through the wire slot 104 and is connected to the pin on the pin connector 3, so as to achieve an electric connectivity.

The above-mentioned structure of the stator assembly is mainly applied to the stepper drive motor, and cooperates with other components such as a rotor, a magnet and a shaft to complete the control of an automobile headlight steering system.

Second Embodiment

The present embodiment will describe a stepper drive motor with few parts and a compact structure.

Specifically as shown in FIGS. 1-7, the stepper drive motor as described in the present embodiment includes the following structure:

a stator 1 formed by a plurality of pole pieces 101 by means of injection overmolding, a columnar connection portion 102 protruding outward being provided on an edge of one of the pole pieces; a mounting groove 103 which is located at a side face of the stator 1 and is integrally formed on the stator 1 by means of injection molding; a coil 2 wound around the stator 1 and used to generate a magnetic field, wherein the coil 2 may include one or two copper coils; a pin connector 3 with a ground pin 301, the pin connector 3 being press-fitted onto the mounting groove 103 in the direction perpendicular to the axial direction of the stator 1, when the stepper drive motor is assembled, a terminal matching the pin connector 3 will be subjected to an axial force, and if an axial installation is adopted, the terminal may be loosened or released under the action of the axial force, the pin connector 3 perpendicular to the stator 1 may effectively prevent looseness, and the other function of the pin connector 3 is that the stepper drive motor may be connected to a customer connector via other pins on the pin connector to obtain a driving signal; and a magnetically conductive ring 4, the stator 1, which is mounted with the coil 2 and the pin connector 3, being pressed into the magnetically conductive ring 4, and the magnetically conductive ring 4 being in clearance fit with the stator 1; and a rotor 5, a shaft 7 and an annular magnet 6; the rotor 5 is firstly pressed into the annular magnet 6 in an interference fit manner, then the annular magnet 6 and the rotor 5 are both pressed into the stator 1, and an outer ring of the annular magnet 6 is in clearance fit with the interior of the stator 1; and the shaft 7 may be of a metallic material or a plastic material, which passes through the interior of the rotor 5 and is fitted with an internal thread of the rotor 5 via an external thread on the shaft, such that the rotational motion of the rotor 5 is converted into a linear movement of the shaft 7.

Preferably, the specific shape of the columnar connection portion is a Y-shaped connection port similar to an English letter Y, the pin connector 3 has a plurality of pins, one ground pin of which is connected to the columnar connection portion 102 via a wire (or the ground pin is directly connected to the columnar connection portion 102 after being bent); and for the convenience of connection, the columnar connection portion 102 located on one of the pole pieces 101 closest to the pin connector 3 may be selected. In particular, as shown in FIGS. 1 and 3A, the columnar connection portion 102 is a Y-shaped connection port structure, the pin connector 3 has five pins, and the ground pin 301 thereof is connected to the Y-shaped connection port 102 on the pole piece closest to the pin connector 3 via a wire 302 (one end of the wire 302 is connected to the ground pin 301, and the other end of the wire 302 is welded to the Y-shaped connection port 102); or the ground pin 301 may overlap or be welded together with the Y-shaped connection port 102 on the pole piece closest to the pin connector 3 after being directly bent (this case is not shown in the drawings).

Preferably, the columnar connection portion 102 (Y-shaped connection port) is in contact with the magnetically conductive ring 4, and on the basis of the preceding description, the magnetically conductive ring 4 establishes a connection with the ground pin 301, thereby satisfying the customer's requirements of electromagnetic compatibility (EMC) of the stepper drive motor including the stator assembly. After the magnetically conductive ring 4 is assembled, since a certain gap exists between the magnetically conductive ring 4 and the pole piece 101 for assembly, in order to ensure a connection, the magnetically conductive ring 4 is pressed at the position close to the pole piece 101 on the outer periphery of the magnetically conductive ring 4 so as to ensure the connection thereof with the columnar connection portion 102. In the actual product, the outer periphery of the magnetically conductive ring 4 has one or two dimple shapes.

Preferably, the interior of the stator 1 further includes a metallic sleeve 105, the metallic sleeve 105 is fixed inside the stator 1 by means of other assembling methods such as injection molding or interference fit, and one end of the rotor 5 is nested around the metallic sleeve 105, the rotor 5 is in clearance fit with the metallic sleeve 105 (equivalent to the function of a sliding bearing for supporting the rotor 5), the outer surface of the metallic sleeve 105 is smooth and is coated with grease, and the metallic sleeve is assembled with the rotor 5 in a clearance fit manner to replace a traditional rear bearing.

Preferably, a plurality of claw piece structures 411 are provided at one end of the magnetically conductive ring 4.

Preferably, four the pole pieces 101 are provided.

Preferably, the stator 1 has a wire slot 104, and a metal wire on the coil 2 passes through the wire slot 104 and is connected to the pin on the pin connector 3, so as to achieve an electric connectivity.

Preferably, the stepper drive motor further includes a bearing 8 connected to the rotor 5 by means of injection molding or cold forming, and an outer ring of the bearing 8 is pressed into a bearing fitting hole 13 inside the stator 1, and the press-fit method may be interference fit or clearance fit. In this way, two ends of the rotor 5 are respectively supported by the bearing 8 and the metallic sleeve 105 and are maintained in the same axis.

Preferably, the stepper drive motor further includes a front end cover 9 and a rear end cover 12, the front end cover 9 is press-fitted into the magnetically conductive ring 4, and the rear end cover 12 is press-fitted onto the pin connector 3 so as to protect the pin on the pin connector 3. In particular, the front end cover 9 is in clearance fit with the magnetically conductive ring 4, and the rear end cover 12 is also in clearance fit with the pin connector 3. In order to effectively fix and lock the entire motor, a plurality of claw piece structures 411 on the magnetically conductive ring 4 are pressed onto the front end cover 9 after being bent.

Preferably, the stepper drive motor further includes an O-ring 11, the O-ring 11 is provided in a nested manner and abuts against the front end cover 9, and after the stepper drive motor is mounted in a customer interface, the O-ring 11 is deformed by pressing so as to provide a mounting pre-tightening force.

Preferably, the stepper drive motor further includes a connecting ball 10 used to be connected to a user terminal, and the connecting ball 10 is thermally riveted to an output end of the shaft 7.

The specific working mode and principle of the above-mentioned stepper drive motor is: when the coil 2 is powered via the pin connector 3, a magnetic field loop is formed between the stator 1, the magnetically conductive ring 4 and the annular magnet 6 to generate a torque, so as to drive the rotor 5 to rotate. If two coils 2 are provided, when the current direction of one coil changes, the magnetic field of the stator 1 will rotate for example by 15 degrees, and the rotor 5 will also rotate by 15 degrees under the action of the magnetic force. If currents passing through the two coils change according to a certain rule, the rotor 5 generates a regular motion (such as forward rotation or reverse rotation) with the change of the magnetic field of the stator 1. When each of the copper coils is powered, the magnetic field flows to the pole piece 101 of the stator 1 through the magnetically conductive ring 4, and claws on the pole piece 101 divide the magnetic field into multiple poles, and the multi-pole magnetic field returns to another pole piece after entering the permanent magnet rotor 5, and then flows to the magnetically conductive ring 4 so as to form a magnetic field loop.

In the stepper drive motor of the present device, since the design of forming the stator by a pole piece group by means of injection molding, directly press-fitting the pin connector with a ground pin onto the stator, connecting the ground pin to the magnetically conductive ring via a pole piece, and using a metallic sleeve to replace a rear bearing is used, the number of parts is reduced and the assembling process is simplified.

While the present device has been disclosed above with the relatively preferred embodiments, the present device is not limited thereto. A variety of changes and modifications made by any people skilled in the art without departing from the spirit and scope of the present device should be comprised in the scope of protection of the present device, so the scope of protection of the present device should be based on the scope defined by the claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stator assembly, comprising:
    a stator formed by a plurality of pole pieces using an injection overmolding process;
    a columnar connection portion protruding outward being provided on an edge of one of the pole pieces;
    a mounting groove located at a side face of said stator;
    a coil wound around said stator;
    a pin connector having a ground pin, the pin connector being press-fitted onto said mounting groove in the direction perpendicular to the axial direction of said stator; and
    a magnetically conductive ring;
    wherein said stator, which is mounted with said coil and the pin connector, is pressed into the magnetically conductive ring.

2. The stator assembly of claim 1, wherein the shape of said columnar connection portion is a Y-shaped connection port similar to an English letter Y.

3. The stator assembly of claim 1, further comprising a wire, wherein said ground pin is connected to said columnar connection portion via the wire.

4. The stator assembly of claim 1, wherein the ground pin is directly connected to said columnar connection portion after being bent.

5. The stator assembly of claim 1, wherein said columnar connection portion is in contact with said magnetically conductive ring.

6. The stator assembly of claim 1, wherein said columnar connection portion is located on one of the pole pieces closest to said pin connector.

7. The stator assembly of claim 1, further comprising:
    a metallic sleeve located inside said stator, the metallic sleeve being fixed inside said stator by means of injection molding or interference fit.

8. The stator assembly of claim 1, further comprising a plurality of claw piece structures located at one end of said magnetically conductive ring.

9. The stator assembly of claim 1, the plurality of pole pieces further comprising four pole pieces.

10. The stator assembly of claim 1, said stator further comprising a wire slot, wherein a metal wire on said coil passes through said wire slot and is connected to the pin on said pin connector.

11. A stepper drive motor, comprising:
    a stator formed by a plurality of pole pieces using an injection overmolding process;
    a columnar connection portion protruding outward being provided on an edge of one of the pole pieces;
    a mounting groove located at a side face of said stator;
    a coil wound around said stator;
    a pin connector having a ground pin, the pin connector being press-fitted onto said mounting groove in the direction perpendicular to the axial direction of said stator;
    a magnetically conductive ring, and said stator, which is mounted with said coil and the pin connector, is pressed into the magnetically conductive ring;
    a rotor having an internal thread;
    a shaft having an external thread, said shaft passes through the interior of said rotor and is mutually fitted with the internal thread on said rotor via the external thread on said shaft, such that the rotational motion of said rotor is converted into a linear movement of said shaft; and
    an annular magnet;
    wherein said rotor is pressed into said annular magnet in an interference fit manner, and said annular magnet is pressed into said stator.

12. The stepper drive motor of claim 11, wherein the specific shape of said columnar connection portion is a Y-shaped connection port similar to an English letter Y.

13. The stepper drive motor of claim 11, further comprising a wire, wherein said ground pin is connected to said columnar connection portion via the wire.

14. The stepper drive motor of claim 11, wherein the ground pin is directly connected to said columnar connection portion after being bent.

15. The stepper drive motor of claim 11, wherein said columnar connection portion is in contact with said magnetically conductive ring.

16. The stepper drive motor of claim 11, wherein said columnar connection portion is located on one of the pole pieces closest to said pin connector.

17. The stepper drive motor of claim 11, further comprising:
    a metallic sleeve located inside said stator, the metallic sleeve being fixed inside said stator by means of injection molding or interference fit, and one end of said rotor being nested around said metallic sleeve, and said rotor being in clearance fit with said metallic sleeve.

18. The stepper drive motor of claim 11, said stator further comprising a wire slot, wherein a metal wire on said coil passes through said wire slot and is connected to the pin on said pin connector.

19. The stepper drive motor of claim 11, further comprising:
   a bearing connected to said rotor by means of injection molding or cold forming, wherein an outer ring of the bearing is pressed into said stator.

20. The stepper drive motor of claim 19, wherein the outer ring of said bearing is press-fitted into a bearing fitting hole inside said stator, and the press-fit method is interference fit or clearance fit.

21. The stepper drive motor of claim 11, further comprising:
   a front end cover; and
   a rear end cover;
   wherein said front end cover is press-fitted into said magnetically conductive ring, and said rear end cover is press-fitted onto said pin connector.

22. The stepper drive motor of claim 21, further comprising:
   an O-ring arranged on said front end cover in a nested manner.

23. The stepper drive motor of claim 21, further comprising a plurality of claw piece structures are provided at one end of said magnetically conductive ring, wherein the plurality of claw piece structures on said magnetically conductive ring are pressed onto the front end cover after being bent.

24. The stepper drive motor of claim 11, further comprising:
   a connecting ball, which is thermally riveted to an output end of said shaft.

* * * * *